FEED MECHANISM FOR RECORDING DEVICES

Filed Nov. 29, 1947 4 Sheets-Sheet 1

INVENTOR.
George Gorham
BY Harry Cohen
ATTORNEY

FEED MECHANISM FOR RECORDING DEVICES

Filed Nov. 29, 1947 4 Sheets-Sheet 2

INVENTOR.
George Gorham
BY
Harry Cohn
ATTORNEY

Oct. 3, 1950 G. GORHAM 2,524,564

FEED MECHANISM FOR RECORDING DEVICES

Filed Nov. 29, 1947 4 Sheets-Sheet 3

INVENTOR.
George Gorham
BY Harry Cohen
ATTORNEY

INVENTOR.

George Gorham

BY Harry Cohen

ATTORNEY

Patented Oct. 3, 1950

2,524,564

UNITED STATES PATENT OFFICE 2,524,564

FEED MECHANISM FOR RECORDING DEVICES

George Gorham, New York, N. Y., assignor, by mesne assignments, to Technicon Cardiograph Corporation, New York, N. Y.

Application November 29, 1947, Serial No. 788,801

19 Claims. (Cl. 346—136)

This invention relates to recorders and more particularly to improved means for feeding or moving the chart paper or record web in relation to the marking element or elements of the recorder.

While useful for other purposes, the present invention was developed primarily for direct writing electro-cardiographs such as that shown, for example, in my application Ser. No. 762,613, filed July 22, 1947, wherein a multiple-lead direct writing electro-cardiograph recorder is disclosed and claimed. The device of the present invention is therefore shown in conjunction with a plurality of marking elements, but it will be understood that the same device may be used in conjunction with a single marking element, and it will be understood further that said device may be used in various recorders other than electro-cardiograph recorders wherein a record is made on a moving web of paper or other suitable sheet material.

One object of the present invention is the provision of improved means for supporting and feeding the record web in relation to the marking element.

Another object is to provide a record-web feeding device which is of such construction as to facilitate the insertion of the web in the device for operation by the latter for moving the web on its support at the recording station.

The above and other objects, features and advantages of the present invention will be fully understood from the following description with reference to the accompanying drawings which, however, are to be considered as illustrative of the invention, in its presently preferred form, but not in limitation thereof.

In the drawings:

Fig. 2 is a plan view of part of said recorder provided with said device;

Figures 8A, 9, 10:
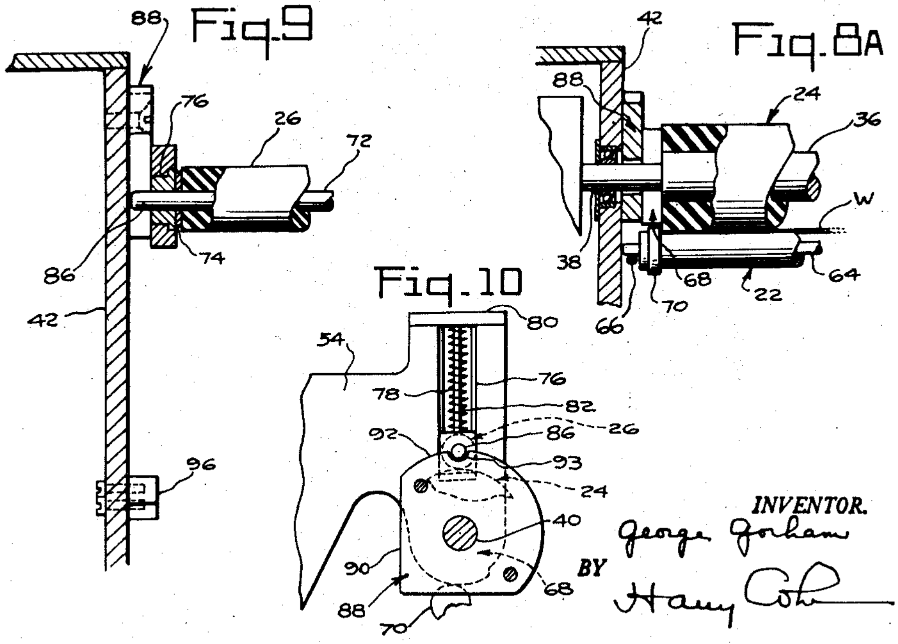
Figure 3:
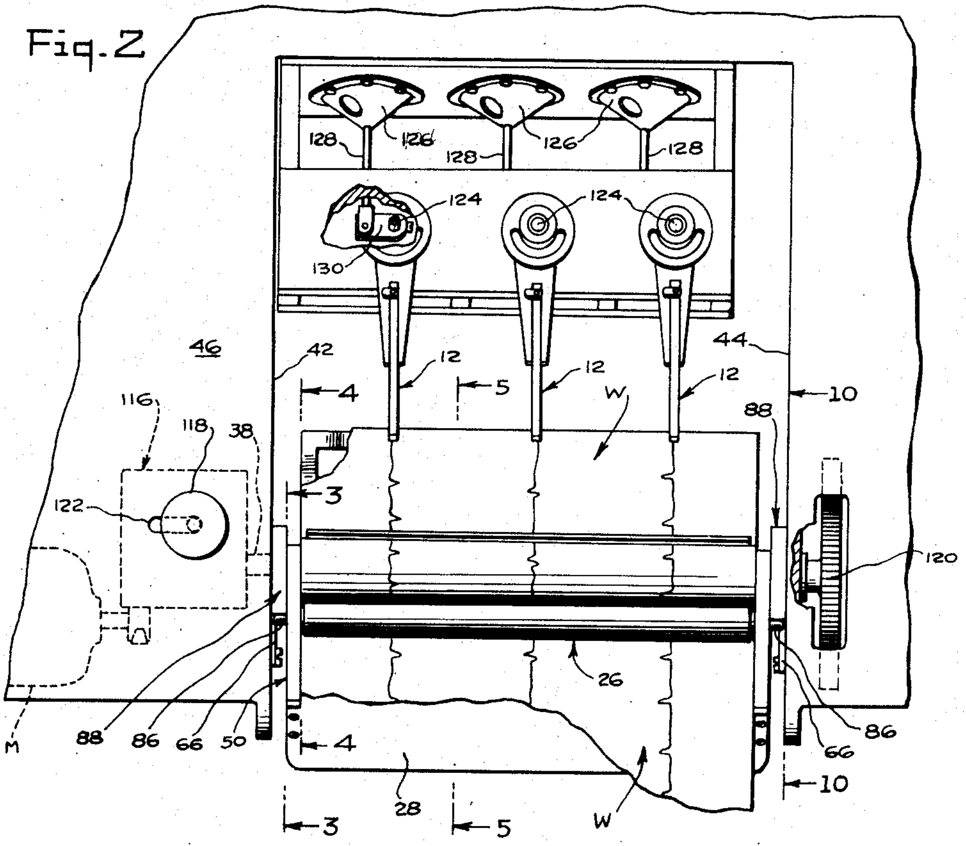
Figure 4:
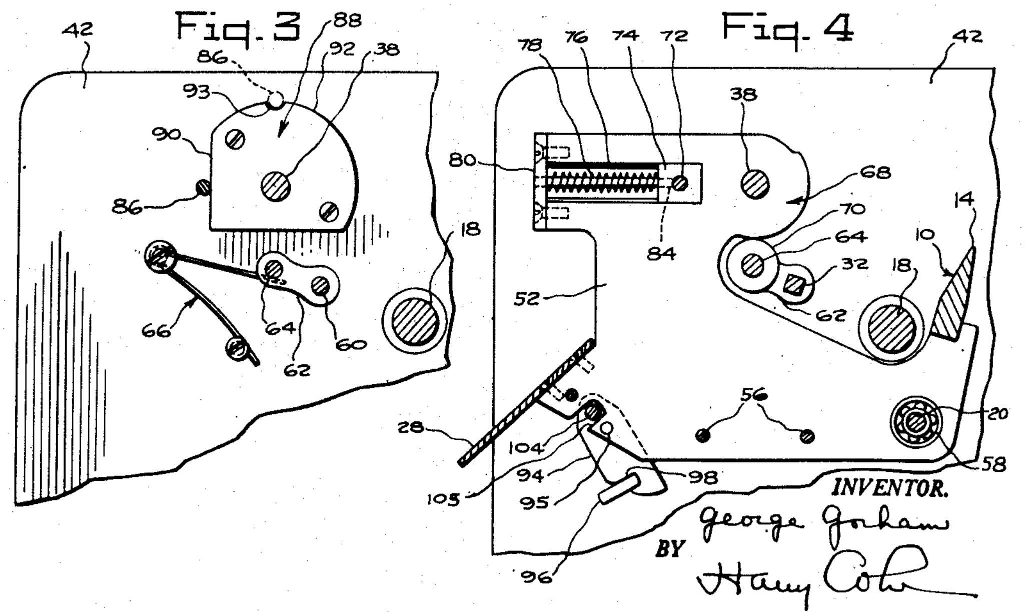
Figures 5, 6:
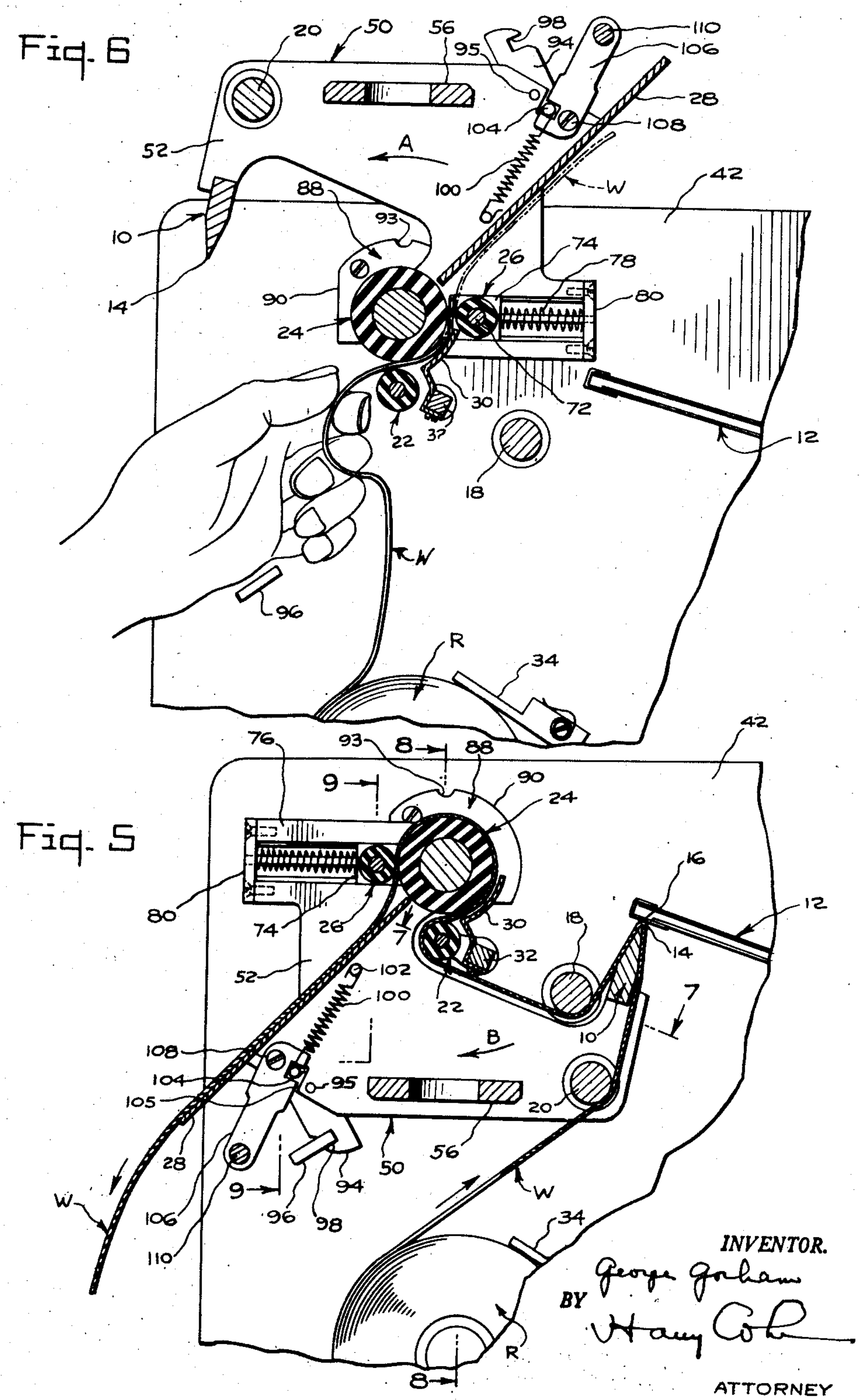
Figure 7:
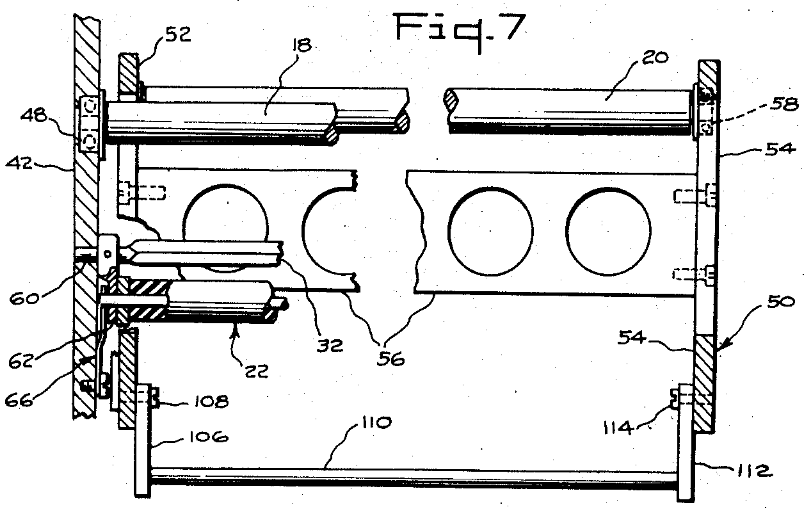
Figure 8:
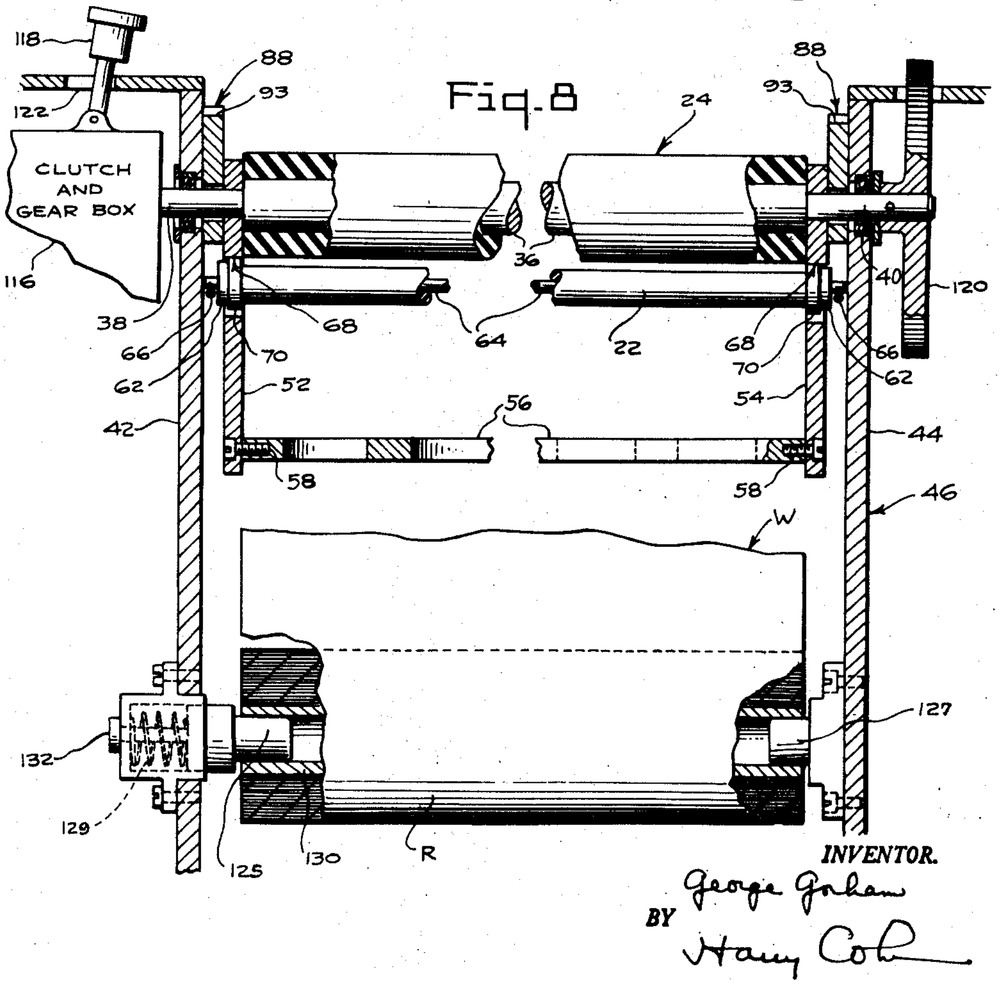

Figs. 3 and 4 are sectional views on the lines 3—3 and 4—4, respectively of Fig. 2;

Fig. 5 is a sectional view on the line 5—5 of Fig. 2;

Fig. 6 is a view similar to Fig. 5 but in a different position of the related parts;

Fig. 7 is a sectional view on the line 7—7 of Fig. 5, portions being omitted for the purpose of illustration;

Fig. 8 is a sectional view on the line 8—8 of Fig. 5;

Fig. 8A is a fragmentary sectional view on the same relative line as Fig. 8 but showing different relative positions of certain parts;

Fig. 9 is a sectional view on the line 9—9 of Fig. 5;

Fig. 10 is a sectional view on the line 10—10 of Fig. 2, but with certain parts in different relative positions.

In the preferred embodiment of the invention, the support 10 for the record-web W at the web-marking station, where the web is marked by one or more marking elements 12 (see Figs. 1, 2 and 5), is in the form of a bar having a narrow edge 14, as described in my above-mentioned application. The web is caused to move in the direction of its length and is directed in its travel over said edge 14 of support 10 so as to form a fold line 16 at said edge longitudinally of said edge and transversely of the web, whereby a very narrow or line-like portion of the web is presented to the marking elements 12 at each instant during the travel of the web from the supply roll R in the operation of the recorder. As shown in Fig. 5, the guide rollers 18 and 20 are provided for directing the web in this folded relation to and from edge 16 of web-support 10. From guide roller 18 the web passes over a roller 22, and over the driven feed roll 24 and then between the latter and the companion pressure roll 26. An inclined plate 28 is provided forwardly of rolls 24 and 26 for directing the web to a suitable receptacle (not shown).

Web support 10 and rollers 20 and 26 are mounted for unitary turning movement about the axis of driven roller 24 to and from the web-feed or operative positions shown in Fig. 5 and, concomitantly, from and to the position shown in Fig. 6. In the latter position, the web support 10 is retracted and rolls 22, 24 and 26 are relatively positioned for the insertion of the web between rolls 22 and 24 and between the latter and roll 26. A web guide-plate 30 carried by a bar 32 is provided to guide the leading end of the web between rolls 24 and 26 after said end of the web is inserted between rolls 22 and 24 in the position of the parts shown in Fig. 6. It will be noted that rolls 22 and 26 are spaced from roll 24, in the positions shown in Fig. 6, thus allowing the web to move freely therebetween, roll 26 guiding the leading end of the web after it passes over guide-plate 30.

After the web W is thus inserted between rolls 22 and 24 and between rolls 24 and 26, the unit is moved forwardly, i. e., in the direction of arrow A (Fig. 6) through about fifteen degrees at which position of the unit roll 22 is moved toward roll 24 to a position at which roll 22 presses the web W against roll 24 (Fig. 8A). In this position of the unit roll 24, when turned by hand, as hereinafter described may be operated in conjunction with roll 22 to feed the desired length of web through rolls 22 and 24 and between rolls 24 and 26. Thereafter, the unit is moved in the same direction to its position shown in Fig. 5, and during that movement roll 22 is moved away from roll 24, roll 26 being maintained in spaced relation to roll 24 until the unit is in its operative position shown in Fig. 5. In the course of the movement of the unit from the position shown in Fig. 6 to the position shown in Fig. 5, support 10 and guide roller 20 engage the web 10 and dispose the latter as shown in Fig. 5, a sufficient length of the web being drawn from the supply roll R. A spring-pressed plate 34 is provided as a friction drag on roll R for tensioning the web.

The means provided for accomplishing the above described operations and functions will now be described in detail.

The driven feed roll 24 is carried by a rotary shaft 36 (Fig. 8) provided with reduced end portions 38 and 40 which are journalled for rotation in bearings carried by the spaced parts 42 and 44 of the frame 46 of the recorder. Guide roller 18 is mounted at its opposite ends in frame parts 42 and 44, respectively, said ends being mounted in anti-friction bearings 48 as indicated in Fig. 7. Guide roller 20, roll 26, plate 28 and web support 10 are carried by a movable frame 50 which includes the opposite side plates 52 and 54 turnably mounted on the ends 38 and 40 of the driven feed roll shaft 36 relatively thereto. A cross member 56 is connected at its opposite ends in any suitable way, as by screws 58 to said side plates 52 and 54 for holding the latter in fixed spaced relation. The opposite ends of web support 10 are secured to said frame plates 52 and 54, and the opposite ends of guide roller 20 are mounted in said side plates in anti-friction bearings 58 as indicated in Figs. 4 and 7.

Guide-plate bar 32 is mounted at its opposite ends in the stationary frame parts 42 and 44 as indicated at 60 in Fig. 7 with respect to the end of which is mounted in part 42, the opposite end of said bar being similarly mounted in part 44. The opposite end portions of bar 32 are cylindrical as indicated at 60 in Fig. 7 so that said bar may turn about its longitudinal axis. An arm 62 is fixed to each of the opposite ends 60 of bar 32 for supporting the ends of the spindle 64 of roller 22. Thus roller 22 is mounted for pivotal movement about the axis of bar 32 toward and away from driven roll 24. A hairpin spring 66 (Figs. 3, 7 and 8) is secured to each of the stationary frame parts 42 and 44 and acts on the adjacent end of spindle 64 of roller 22 to bias the latter toward roll 24, as is readily apparent. Roller 22 is moved toward and away from roll 24 in the course of the movement of frame 50 from the position thereof shown in Fig. 6 to the position thereof shown in Fig. 5, as described above, and it will be noted that in the latter or normal position, roller 22 is spaced from roll 24 and acts only as a guide roller for web W in directing the latter over roll 24 during the travel of the web.

The movement of roller 22 toward and away from roller 24 is accomplished under the control of frame 50 and, more particularly by cams carried by said frame. Specifically, as here shown, each of the side plates 52 and 54 is formed with an integral cam 68 (Figs. 4 and 8) which engage the companion followers 70, respectively, carried by roller 22, said cam followers being held in engagement with their companion cams by springs 66. It will be understood that the edges of cam 68, which are engaged by cam followers 70 on the shaft of roller 22, are designed (1) so that when the frame is in its fully retracted position (Fig. 6) roller 22 is spaced from roll 24 so that the leading end of the web may be freely inserted, as described above, (2) so that after the web is inserted and the frame 50 is moved to an intermediate position about 15° in the direction of the arrow A, the roller 22 moves toward roll 24 and presses the web against said roll (Fig. 8A) for feeding of the web by manual operation of roll 24, and (3) so that movement of the frame 50 from said intermediate position to the operative position thereof (Fig. 5) roller 22 is spaced from roll 24 and acts as a guide roller.

Roll 26 which normally co-acts with driven roll 24 in moving the record web W during the operation of the recorder is carried by frame 50 and is movable toward and away from roll 24 automatically by movement of said frame. The spindle 72 of roll 26 is mounted at its opposite ends in blocks 74 which are slidably movable in the ends in blocks 74 which are slidably movable in guides 76 integral with or carried by frame plates 52 and 54. Said blocks 74 are biased by springs 78 for movement toward roll 24, the opposite ends of each spring bearing on the companion block 74 and the end plate 80 of the companion guide 76. A stationary centering pin 82 is provided in each guide 76 for the companion spring, block 74 having a hole 84 (Fig. 4) to provide for movement of said block longitudinally of said pin, and the outer end of said pin being fixed to end plate 80. Spindle 72 projects through the companion guide blocks 74 and terminates in outer end portions 86 which engage the stationary cams 88 which are carried by stationary frame parts 42 and 44. It will be noted that cams 88 are positioned with reference to the turning axis of roll 24, which is the turning axis of frame 50. Referring to Figs. 5 and 6 in conjunction with Fig. 3, it will be understood that when frame 50 is turned in the direction of the arrow B from the position shown in Fig. 5 to the position shown in Fig. 6, the ends 86 of the spindle 72 of roll 24 move upwardly along the vertical cam edges 90 and thereby move blocks 74, against the pressure of springs 78, to move roll 26 away from roll 24. Continued movement of frame 50 in the same direction causes spindle ends 86 to ride on the curved edges 92 of the companion cams 88, respectively, until the frame is in its fully retracted position shown in Fig. 6. A notch 93 is provided in the edge of each cam 88 in which the spindle ends 86 are releasably engageable for holding the frame 50 releasably in the intermediate position in which roller 22 is in pressure-applying relation to roll 24 (Fig. 8A). Thus, notches 93 in conjunction with spindle ends 86 provide means for releasably holding the frame in a position in which rolls 22 and 24 may be manually turned for feeding the web, roll 24 being disconnected from its driving means as subsequently described. The leading end of the web W may be inserted and fed between and by rolls 22 and 24, when the frame 50 is in said intermediate position.

Figure 1:
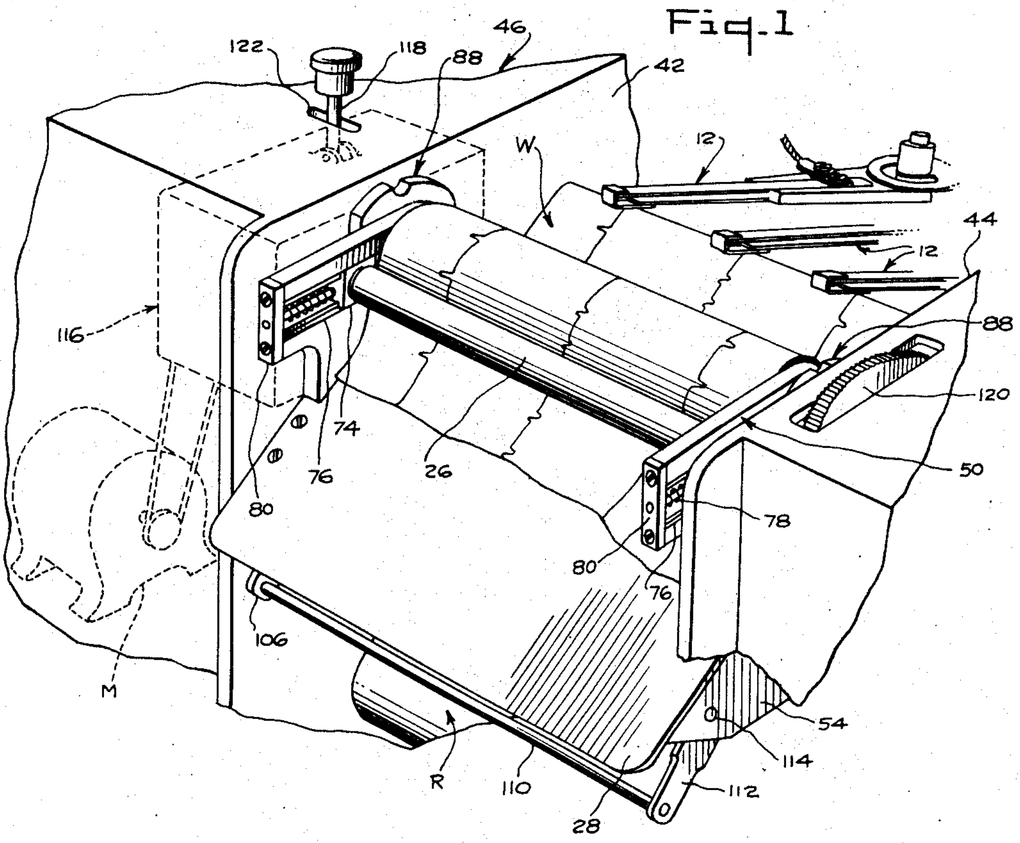
Fig. 1 is a perspective view of part of a recorder provided with a device embodying the present invention, parts being broken away for the purpose of illustration.

Provision is made for releasably locking frame 50 in the operative position thereof. For this purpose, a latching or locking member or lever 94 is pivotally mounted on frame plate 52 at 95 for releasable engagement with a catch 96 carried by part 42 of the main stationary frame. Movable locking member 94 is provided with a notch 98 in which catch 96 is engaged when movable frame 50 is in operative position as shown in Fig. 5. Member 94 is held releasably in engagement with catch 96 by a spring 100 which is secured at one end to frame part 42 by the pin 102 and at its opposite end to member 94 by pin 104 carried by the latter. The means for releasing frame-locking member 94 from catch 96, whereby to release frame 50 from frame 46 for movement, comprises an arm 106 which is pivotally mounted on movable frame part 52 by the pivot screw 108. Said arm 106 has a notch 110 in which pin 104 of locking member 94 is engaged. When it is desired to unlock frame 50 from stationary frame 46, arm 106 is moved clockwise, viewing Fig. 5, whereby to move member 94 out of engagement with catch 96. Releasing member 106 is conveniently operable by a bar or rod 110 which is connected at one end thereof to the outer end of member 106. The opposite end of rod 110 is connected to the outer end of an arm 112 which is pivotally connected to frame part 54 by the pivot screw 114. As shown in Fig. 1, bar 110 is conveniently located below plate 28 of frame 50 so that when it is desired to move said frame to its retracted position, this may be done by raising bar 110 whereby to unlock the frame, and by continuing to move said bar in the same direction engaging the same with the underside of frame plate 28 and moving the latter to the position shown in Fig. 6. When the frame 50 is returned to its normal or operative position (Fig. 5) locking member 94 automatically engages catch 96 and releasably locks said frame in said position. Frame 50 has an edge recess 105 for pin 104.

The main feed roll 24 is driven at a uniform rate by a motor M which is operatively connected to the shaft of said roll. Preferably a clutch and variable gear-ratio transmission indicated more or less schematically at 116 is provided so that roll 24 may be driven at a selected speed. A gear shift lever 118 is provided for changing the gear ratio and for disengaging the transmission from the roll shaft 38. It will be understood that the variable gear and clutch mechanism may be of any suitable type and need not be described since such mechanisms are well known and do not per se form part of the present invention. However, it may be noted that I prefer to use a change-speed and clutch mechanism having provision for operating roll 24 at two different uniform speeds one of which is twice the other. In Fig. 1, lever 118 is shown in its neutral position, the shaft of roll 24 being de-clutched and therefore free to be turned manually by the hand wheel 120 which is fixed to the end portion 40 of said shaft. Said hand wheel 120 may be used to operate roll 24 for adjusting the web W preliminary to the operation of the recorder. In the position of lever 118 shown in Fig. 8, the shaft of roll 24 is operatively connected to the transmission gears for operation at the normal speed, and when the lever 118 is moved to its opposite position adjacent the opposite end of the guide slot 122 the shaft of roll 24 is operatively connected for operation at twice the normal speed. It will be understood that the gear transmission mechanism 116 may have provision for more than two speeds.

The means and mechanisms for actuating the marking elements 12 are preferably of the construction shown and claimed in my above mentioned application, but may be of any other suitable construction, and therefore need not be specifically described herein. It may be noted, however, that elements 12 are oscillated by their respective spindles 124, in accordance with variations which are to be recorded, laterally of the web. As shown in Fig. 2, each spindle 124 is actuated by a member 126 which is connected by a rod 128 to a crank arm 130 fixed to the spindle 124. Members 126 are operated by the driving coils of an electro-magnetic device which operates in accordance with the variations to be recorded.

The supply roll R of the record web or chart paper is removably mounted for rotation on stationary cylindrical supports 125 and 127 carried by parts 42 and 44, respectively, of the recorder frame 46. Support 125 is spring projected by the spring 129 of a known device and may be retracted to facilitate mounting the roll R in position. It will be readily understood that when one roll R is depleted, the core of spool 130 may be easily removed by retracting the support 125 by the retracting pin 132. It will be understood, of course, that the means for mounting roll R for rotation to pay out the web, as the latter is drawn therefrom by the feed roll 24 and its companion pressure roll 26, may be of any other suitable construction.

Various changes in the details of construction and in the arrangement of parts may be made in the device of the present invention without departing from the underlying idea and principles within the scope of the appended claims.

The subject matter hereof is related to my application Ser. No. 100,449, filed June 21, 1949.

Having thus described my invention, what I claim and desire to secure by Letters Patent, is:

1. In a recorder provided with means for making a record on a web of sheet material, a support for the web, means including a driven feed roll and a companion pressure roller for moving said web in the direction of its length on said support and in relation to said marking means in the recording operation, means in juxtaposition to said feed roll for guiding the web to the latter, means mounting said pressure roller for movement in relation to said feed roll and said guide means from a normal position in web feeding relation with said feed roll to a retracted web-guiding position in which said pressure roller is positioned in juxtaposition to said guide means whereby the leading end of the web when advanced on the surface of said guide means and said driven roll is disposed between said pressure roller adjacent said feed roller to be pressed against said driven feed roll by said pressure roller when the latter is returned to said normal position thereof, and a frame which carries said web support and which is mounted for movement from a position in which said supporting means is positioned at one side of the axis of said feed roll between the latter and said marking means, for supporting said web, to a position in which said supporting means is retracted from said position between said feed roll and marking means, said pressure roller being carried by said frame for said movement from said normal position thereof to said retracted position thereof, said pressure roller being also mounted for movement on said frame in a direction away from said feed roll to release the pressure of said pressure roller on said feed roll when said pressure roller is in said retracted position thereof in juxtaposition to said guide means, said guide means including a roller mounted for movement toward and away from said driven feed roll and operable when moved toward said feed roll to press the web against the latter for feeding the web by the conjoint action of said feed roll and said last mentioned roller while said first mentioned pressure roller is displaced from said normal position thereof.

2. In a recorder provided with means for marking a record on a web of sheet material, means including a driven feed roll and a companion pressure roller for moving said web in the direction of its length in relation to said marking means, a frame mounted for turning movement about the axis of said feed roll, means carried by said frame and having an edge for supporting the web for the action thereon of said marking means when said frame is in a predetermined position thereof, said frame being movable about said axis to retracted positions to facilitate the insertion of the leading end of the web between said feed roll and said pressure roller and to adjust said web in guided position between said feed roll and said pressure roller, a web-guide mounted independently of said frame, and a companion web-guide carried by and movable with said frame, said web-guides being disposed so as to be positioned below and at opposite sides of said edge of said web supporting means, when said frame is in said predetermined position, for directing the web upwardly to and downwardly from said edge during the travel of said web over said edge.

3. In a recorder provided with means for marking a record on a web of sheet material, means including a driven feed roll and a companion pressure roller for moving said web in the direction of its length in relation to said marking means, a frame mounted for turning movement about the axis of said feed roll, means carried by said frame and having an edge for supporting the web for the action thereon of said marking means when said frame is in a predetermined position thereof, said frame being movable about its axis to retracted positions to facilitate the insertion of the leading end of the web between said feed roll and said pressure roller and to adjust said web in guided position between said feed roll and said pressure roller, a web-guide mounted independently of said frame, and a companion web-guide carried by and movable with said frame, said web-guides being disposed so as to be positioned below and at opposite sides of said edge of said web supporting means, when said frame is in said predetermined position, for directing the web upwardly to and downwardly from said edge during the travel of said web over said edge, and an aditional web-guide mounted independently of said frame ajacent said driven feed roll for directing the web from one of said first-mentioned guides to said feed roll.

4. In a recorder provided with means for marking a record on a web of sheet material, means including a driven feed roll and a companion pressure roller for moving said web in the direction of its length in relation to said marking means, a frame mounted for turning movement about the axis of said feed roll, means carried by said frame and having an edge for supporting the web for the action thereon of said marking means when said frame is in a predetermined position thereof, said frame being movable about its axis to a retracted position to facilitate the insertion of the leading end of the web between said feed roll and said pressure roller, a web-guide mounted independently of said frame, and a companion web-guide carried by and movable with said frame, said web-guides being disposed so as to be positioned below and at opposite sides of said edge of said web supporting means, when said frame is in said predetermined position, for directing the web upwardly to and downwardly from said edge during the travel of said web over said edge, and an additional web-guide mounted independently of said frame adjacent said driven feed roll for directing the web from one of said first-mentioned guides to said feed roll, said additional web-guide being mounted for limited movement toward and away from said feed roll and movable under the control of said frame to press the web against said feed roll in a retracted position of said frame for feeding the web by manual operation of said feed roll for disposing the web in operative relation to the latter preliminary to the feed of the web by said feed roll and said companion pressure roller.

5. In a recorder provided with means for marking a record on a web of sheet material, means including a driven feed roll and a companion pressure roller for moving said web in the direction of its length in relation to said marking means, a frame mounted for turning movement about the axis of said feed roll, means carried by said frame and having an edge for supporting the web for the action thereon of said marking means when said frame is in a predetermined position thereof, said frame being movable about said axis to a retracted position to facilitate the insertion of the leading end of the web between said feed roll and said pressure roller, said pressure roller being carried by said frame and having a limited movement thereon toward and away from said feed roll, and means with respect to which said frame is movable operatively connected to said pressure roller for moving the latter on said frame toward and away from said feed roll when said frame is moved about the axis of said feed roll, and a web-guide mounted for limited movement toward and away from said feed roll and movable under the control of said frame to press the web against said feed roll in a retracted position of said frame for feeding of the web by manual operation of said feed roll for disposing the web in operative relation to the latter preliminary to the feed of the web by said feed roll and said companion pressure roller.

6. In a recorder provided with means for marking a record on a web of sheet material, means including a driven feed roll and a companion pressure roller for moving said web in the direction of its length in relation to said marking means, a frame mounted for turning movement about the axis of said feed roll, means carried by said frame and having an edge for supporting the web for the action thereon of said marking means when said frame is in a predetermined position thereof, said frame being movable about said axis to a retracted position to facilitate the insertion of the leading end of the web between said feed roll and said pressure roller, said pressure roller guiding said web in said retracted position, said pressure roller being carried by said frame and having a limited movement thereon toward and away from said feed roll, and cam means operatively connected to said pressure roller for moving the latter on said frame toward and away from said feed roll when said frame is moved about the axis of said feed roll.

7. In a recorder provided with means for marking a record on a web of sheet material, means including a driven feed roll and a companion pressure roller for moving said web in the direction of its length in relation to said marking means, a frame mounted for turning movement about the axis of said feed roll, means carried by said frame and having an edge for supporting the web for the action thereon of said marking means when said frame is in a predetermined position thereof, said frame being movable about said axis to a retracted position to facilitate the insertion of the leading end of the web between said feed roll and said pressure roller, said pressure roller being carried by said frame and having a limited movement thereon toward and away from said feed roll, and means with respect to which said frame is movable operatively connected to said pressure roller for moving the latter on said frame toward and away from said feed roll when said frame is moved about the axis of said feed roll, and a web-guide mounted for limited movement toward and away from said feed roll and movable under the control of said frame to press the web against said feed roll in a retracted position of said frame for feeding of the web by manual operation of said feed roll for disposing the web in operative relation to the latter preliminary to the feed of the web by said feed roll and said companion pressure roller, said frame having parts thereof provided with cam formations engaging said web-guide for effecting said movement of the latter toward and away from said feed roll.

8. In a recorder provided with means for marking a record on a web of sheet material, means including a driven feed roll and a companion pressure roller for moving said web in the direction of its length in relation to said marking means, a frame mounted for turning movement about the axis of said feed roll, means carried by said frame and having an edge for supporting the web for the action thereon of said marking means when said frame is in a predetermined position thereof, said frame being movable about its axis to a retracted position to facilitate the insertion of the leading end of the web between said feed roll and said pressure roller, a web-guide mounted independently of said frame, and a companion web-guide carried by and movable with said frame, said web-guides being disposed so as to be positioned below and at opposite sides of said edge of said web supporting means, when said frame is in said predetermined position, for directing the web upwardly to and downwardly from said edge during the travel of said web over said edge, and an additional web-guide mounted independently of said frame adjacent said driven feed roll for directing the web from one of said first-mentioned guides to said feed roll, said additional web-guide being mounted for limited movement toward and away from said feed roll and movable under the control of said frame to press the web against said feed roll in a retracted position of said frame for feeding of the web by manual operation of said feed roll for disposing the web in operative relation to the latter preliminary to the feed of the web by said feed roll and said companion pressure roller, said frame having parts thereof provided with cam formations engaging said web-guide for effecting said movement of the latter toward and away from said feed roll.

9. In a recorder provided with means for marking a record on a web of sheet material, means including a driven feed roll and a companion pressure roller for moving said web in the direction of its length in relation to said marking means, a frame mounted for turning movement about the axis of said feed roll, means carried by said frame and having an edge for supporting the web for the action thereon of said marking means when said frame is in a predetermined position thereof, said frame being movable about said axis to a retracted position to facilitate the insertion of the leading end of the web between said feed roll and said pressure roller, said pressure roller being carried by said frame and having a limited movement thereon toward and away from said feed roll, and cam means operatively connected to said pressure roller for moving the latter on said frame toward and away from said feed roll when said frame is moved about the axis of said feed roll, and a web-guide mounted for limited movement toward and away from said feed roll and movable under the control of said frame to press the web against said feed roll in a retracted position of said frame for feeding of the web by manual operation of said feed roll for disposing the web in operative relation to the latter preliminary to the feed of the web by said feed roll and said companion pressure roller, said frame having parts thereof provided with cam formations engaging said web-guide for effecting said movement of the latter toward and away from said feed roll.

10. In a recorder provided with means for marking a record on a web of sheet material, means including a driven feed roll and a companion pressure roller for moving said web in the direction of its length in relation to said marking means, a frame mounted for turning movement about the axis of said feed roll, means carried by said frame and having an edge for supporting the web for the action thereon of said marking means when said frame is in a predetermined position thereof, said frame being movable about said axis to a retracted position to facilitate the insertion of the leading end of the web between said feed roll and said pressure roller, said pressure roller guiding said web in said retracted position, said pressure roller being carried by said frame and having a limited movement thereon toward and away from said feed roll, and cam means with respect to which said frame is movable operatively connected to said pressure roller for moving the latter on said frame toward and away from said feed roll when said frame is moved about the axis of said feed roll, said cam means being stationary and said frame having spring operated means for resiliently holding said pressure roller in pressure-applying relation to said feed roll when said frame is in said predetermined position thereof and for yieldingly opposing movement of said pressure roller by said cam means away from said feed roll during the movement of said frame to said retracted position thereof.

11. In a recorder provided with means for marking a record on a web of sheet material and with means for moving said web from a supply source in the direction of its length in relation to said marking means; a support for the web having an edge over which the web travels from said source and which extends transversely of the web in juxtaposition to said marking means, and a movable frame carrying said support and movable from a normal position in which said support is positioned between said web-moving means and both said supply source and marking means for supporting the web to a retracted position in which the web support is clear of and completely separated from the web, and a pair of web guides constructed and arranged to direct the web so that portions thereof which are at opposite sides of said edge diverse downwardly from said edge during the travel of the web, said web guides being relatively movable and one of said guides being movable with said frame to release and clear the web when the frame is moved to said retracted position thereof, in which position the web extends directly from said source to said web-moving means for the automatically realignment of the web with said one guide, said support and said marking means on the return of the frame to its normal position.

12. In a recorder provided with means for marking a record on a web of sheet material, a stationary frame, a driven feed roll mounted in said frame for rotation for moving the web in the direction of its length, a movable frame mounted for turning movement about the axis of said feed roll, a web support carried by said movable frame, and a pressure roller carried by said movable frame for rotation about an axis parallel to the axis of the feed roll, said web support and said pressure roller being movable about said axis of the feed roll from an operative position, in which said pressure roller cooperates with said feed roll to move the web in the direction of its length and in which the support positions the web in operative relation to said marking means, to a retracted position in which said pressure roller is spaced from said feed roll in parallel relation thereto to facilitate the insertion of the leading end of the web between said feed and pressure rolls.

13. In a recorder provided with means for marking a record on a web of sheet material, a stationary frame, a driven feed roll mounted in said frame for rotation for moving the web in the direction of its length, a movable frame mounted for turning movement about the axis of said feed roll, a web support carried by said movable frame, and a pressure roller carried by said movable frame for rotation about an axis parallel to the axis of the feed roll, said web support and said presser roller being movable about said axis of the feed roll from an operative position, in which said pressure roller cooperates with said feed roll to move the web in the direction of its length and in which the support positions the web in operative relation to said marking means, to a retracted position in which said pressure roller is spaced from said feed roll in parallel relation thereto to facilitate the insertion of the leading end of the web between said feed and pressure rolls, means on said movable frame for guiding said pressure roller for sliding movement toward and away from said feed roll, spring means biasing said pressure roller toward said feed roll and pressing the pressure roller against said feed roll in said operative position.

14. In a recorder provided with means for marking a record on a web of sheet material, a stationary frame, a driven feed roll mounted in said frame for rotation for moving the web in the direction of its length, a movable frame mounted for turning movement about the axis of said feed roll, a web support carried by said movable frame, and a pressure roller carried by said movable frame for rotation about an axis parallel to the axis of the feed roll, said web support and said pressure roller being movable about said axis of the feed roll from an operative position, in which said pressure roller cooperates with said feed roll to move the web in the direction of its length and in which the support positions the web in operative relation to said marking means, to a retracted position in which said pressure roller is spaced from said feed roll in parallel relation thereto to facilitate the insertion of the leading end of the web between said feed and pressure rolls, means on said movable frame for guiding said pressure roller for sliding movement toward and away from said feed roll, spring means biasing said pressure roller toward said feed roll and pressing the pressure roller against said feed roll in said operative position, and cam means operable on said pressure roller during the movement of the latter to said retracted position thereof for moving said pressure roller against said spring means to position said pressure roller in said spaced position in relation to the feed roll.

15. A recorder as defined by claim 12, wherein said pressure roller is disposed at the front of said feed roll, in the operative position of said pressure roller, and at the back of said feed roll in the retracted position of said pressure roller.

16. In a recorder provided with means including a feed roll and a companion pressure roller for feeding a web in the direction of its length and with means for marking a record on the web during said movement of the latter, a frame carrying said feed roll for rotation about an axis transversely of the web feed, a movable web support mounted for movement about said axis of the feed roll concentrically therewith, said web support being swingably movable about said axis from an operative position, in which it supports the web rearwardly of the feed roll in operative relation to said marking means, to a retracted position forwardly of said feed roll to facilitate the insertion of the leading end of the web between said feed roll and said companion pressure roller.

17. In a recorder provided with means including a feed roll and a companion pressure roller for feeding a web in the direction of its length and with means for marking a record on the web during said movement of the latter, a frame carrying said feed roll for rotation about an axis transversely of the web feed, a movable web support mounted for movement about said axis of the feed roll concentrically therewith, said web support being swingably movable about said axis from an operative position, in which it supports the web rearwardly of the feed roll in operative relation to said marking means, to a retracted position forwardly of said feed roll to facilitate the insertion of the leading end of the web between said feed roll and said companion pressure roller, and guides carried by said last mentioned and first mentioned frames, respectively, for respectively guiding the web from the source of web supply to said support and for guiding the web from said support to said feeding means, said guide on the movable frame being automatically retracted from the web, while the web is engaged with the other of said guides, when said support is moved to said retracted position thereof.

18. In a recorder provided with means including a feed roll and a companion pressure roller for feeding a web in the direction of its length and with means for marking a record on the web during said movement of the latter, a frame carrying said feed roll for rotation about an axis transversely of the web feed, a movable web support mounted for movement about said axis of the feed roll concentrically therewith, said web support being swingably movable about said axis from an operative position, in which it supports the web rearwardly of the feed roll in operative relation to said marking means, to a retracted position forwardly of said feed roll to facilitate the insertion of the leading end of the web between said feed roll and said companion pressure roller, said movable frame comprising a guide which is movable therewith and is positioned to automatically engage and disengage the web concomitantly with the movement of said web support to and from said operative position thereof.

19. In a recorder provided with means including a feed roll and a companion pressure roller for feeding a web in the direction of its length and with means for marking a record on the web during said movement of the latter, a frame carrying said feed roll for rotation about an axis transversely of the web feed, a movable web support mounted for movement about said axis of the feed roll concentrically therewith, said web support being swingably movable about said axis from an operative position, in which it supports the web rearwardly of the feed roll in operative relation to said marking means, to a retracted position forwardly of said feed roll to facilitate the insertion of the leading end of the web between said feed roll and said companion pressure roller, said movable frame comprising a guide which is movable therewith and is positioned to automatically engage and disengage the web concomitantly with the movement of said web support to and from said operative position thereof, and a companion guide carried by said stationary frame and positioned in relation to said movable frame to automatically engage and disengage the web concomitantly with the movement of said web support to and from said operative position thereof.

GEORGE GORHAM.

REFERENCES CITED

The following references are of record in the file of this patent:

UNITED STATES PATENTS

| Number | Name | Date |
|---|---|---|
| 1,757,012 | Foote | May 6, 1930 |
| 1,820,088 | Parker et al. | Aug. 25, 1931 |
| 1,987,406 | May | Jan. 8, 1935 |
| 2,412,639 | Traugott | Dec. 17, 1946 |